(12) United States Patent
Poeluev

(10) Patent No.: US 7,734,822 B2
(45) Date of Patent: Jun. 8, 2010

(54) METHOD AND APPARATUS FOR RESOLVING A WEB SITE ADDRESS WHEN CONNECTED WITH A VIRTUAL PRIVATE NETWORK (VPN)

(75) Inventor: Yuri Poeluev, Waterloo (CA)

(73) Assignee: Certicom Corp, Mississauga (CA)

( * ) Notice: Subject to any disclaimer, the term of this patent is extended or adjusted under 35 U.S.C. 154(b) by 31 days.

(21) Appl. No.: 12/110,661

(22) Filed: Apr. 28, 2008

(65) Prior Publication Data

US 2009/0077651 A1    Mar. 19, 2009

Related U.S. Application Data

(63) Continuation of application No. 09/903,991, filed on Jul. 13, 2001, now Pat. No. 7,366,794.

(51) Int. Cl.
*G06F 15/173* (2006.01)
(52) U.S. Cl. ........................ 709/246; 709/223; 709/224; 709/238
(58) Field of Classification Search ......... 709/223–224, 709/238, 246
See application file for complete search history.

(56) References Cited

U.S. PATENT DOCUMENTS

| | | | |
|---|---|---|---|
| 6,298,383 B1 * | 10/2001 | Gutman et al. ............... | 709/229 |
| 6,425,003 B1 | 7/2002 | Herzog et al. | |
| 6,466,977 B1 * | 10/2002 | Sitaraman et al. ........... | 709/225 |
| 6,502,135 B1 | 12/2002 | Munger et al. | |
| 6,708,187 B1 | 3/2004 | Shanumgam et al. | |
| 6,832,322 B1 | 12/2004 | Boden et al. | |
| 2002/0103931 A1 | 8/2002 | Mott | |

OTHER PUBLICATIONS

Johnson, David B.; "Mobile Host Internetworking Using IP Loose Source Routing"; Feb. 1993; School of Computer Science Carnegie Mellon University; CMU-CS-93-128; Pittsburgh, PA.
Postel J.; "User Datagram Protocol"; RFC-768; Aug. 28, 1980; USC/Information Sciences Institute.
Mockapetris, P.; "Domain Names—Concepts and Facilities"; RFC-882; Nov. 1983; USC/Information Sciences Institute.
Mockapetris, P.; "Domain Names—Implementation and Specification"; RFC-883; Nov. 1983; USC/Information Sciences Institute.

(Continued)

*Primary Examiner*—Hussein A. Elchanti
(74) *Attorney, Agent, or Firm*—Brett J. Slaney; John R. S. Orange; Blake, Cassels & Graydon LLP

(57) ABSTRACT

The present invention is directed at a method and apparatus of resolving an address location for a web site when connected with a virtual private network (VPN). Once the public host is connected to, or logged on to, the VPN, a software module within the public host monitors domain name requests and routes them to a domain name server (DNS) associated with the VPN. The VPN DNS then resolves the address location request and returns the address location to the software module in the form of a domain name response. The software module then forwards the address location to the requesting public host.

21 Claims, 2 Drawing Sheets

OTHER PUBLICATIONS

Figure 1:
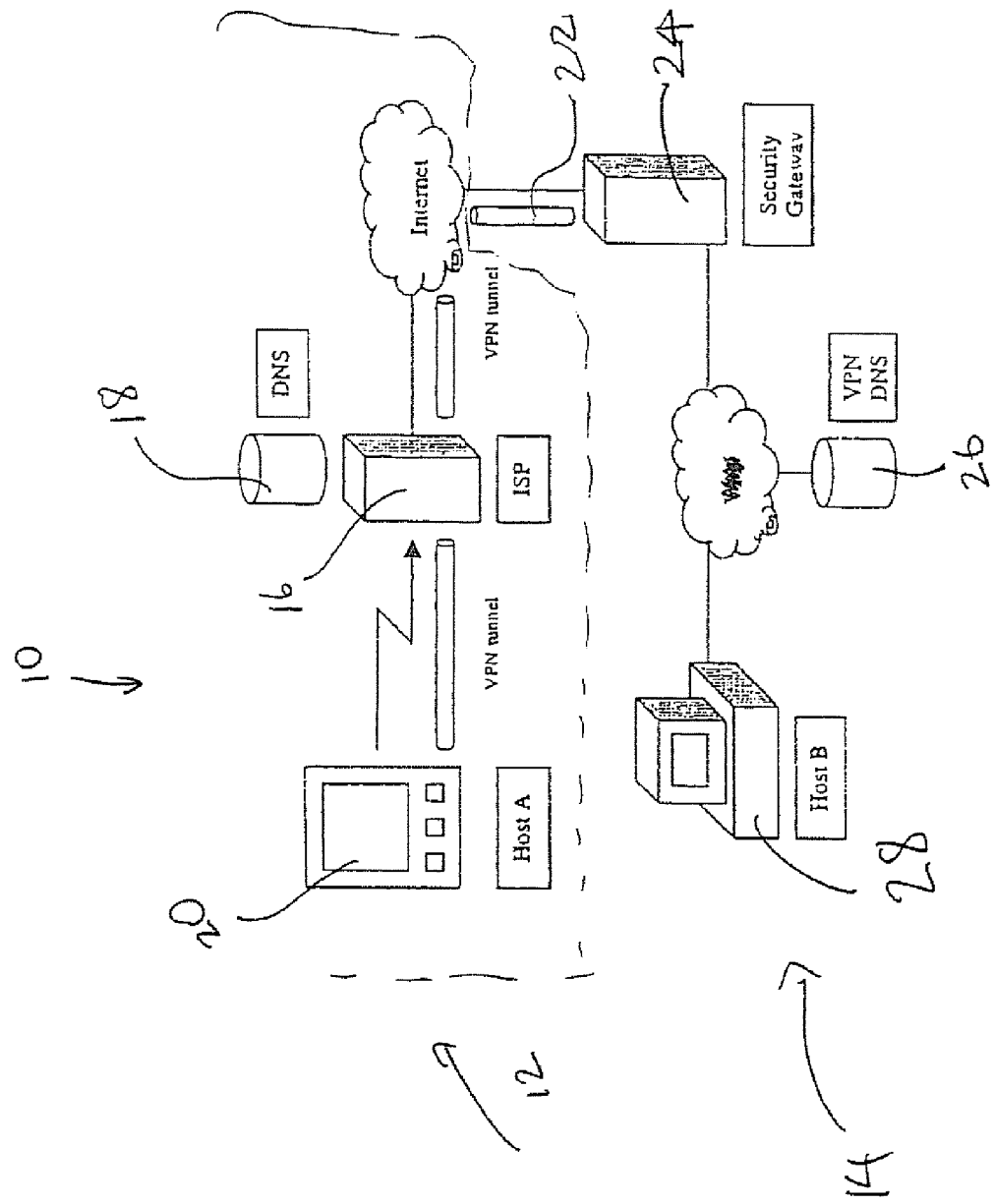

Partridge, C.; "Mail Routing and the Domain System"; RFC-974; Jan. 1986;CSNET CIC BBN Laboratories Inc.

Stahl, M.; "Domain Administrators Guide"; RFC-1032; Nov. 1987; SRI International.

Lottor, M.; "Domain Administrators Operations Guide"; RFC-1033; Nov. 1987; SRI International.

Mockapetris, P.; "Domain Names—Concepts and Facilities"; RFC-1034; Nov. 1987; USC/Information Sciences Institute.

Mockapetris, P.; "Domain Names—Implementation and Specification"; RFC-1035; Nov. 1983; USC/Information Sciences Institute.

Braden, R. (Editor); "Requirements for Internet Hosts—Application and Support"; RFC-1123; Oct. 1989; USC/Information Sciences Institute.

\* cited by examiner

METHOD AND APPARATUS FOR RESOLVING A WEB SITE ADDRESS WHEN CONNECTED WITH A VIRTUAL PRIVATE NETWORK (VPN)

CROSS-REFERENCE TO RELATED APPLICATIONS

The present application is a continuation of U.S. patent application Ser. No. 09/903,991 filed on Jul. 13, 2001, now U.S. Pat. No. 7,366,794 the contents of which are hereby incorporated by reference.

FIELD OF THE INVENTION

The present invention relates, in general, to virtual private networks and, more specifically, to a method and apparatus for resolving a web site address when connected with a virtual private network (VPN).

BACKGROUND OF THE INVENTION

In the high tech world of data communication and the Internet, having the capability to access both private and public web sites at the same time is becoming increasingly important. While, accessing public web sites over the Internet is quite simple, accessing private web sites over the Internet is more difficult unless one is logged on to a private network associated with the private sites. Generally, private web sites are located in a private network while the public sites are located in a public network.

When a public host is connected to a virtual private network (VPN), i.e. connected to a private network using a public network such as the Internet, the host should be able to receive domain names for web sites that are associated with the VPN, otherwise, the public host is required to use raw IP addresses to communicate with the web sites associated with the VPN. Commonly, network interfaces located on the public hosts assist in this communication with other public sites, on the Internet. Each network interface has specific parameters, such as local IP address default route address, network mask, DNS server address etc . . . that are pre-assigned. Therefore, when a public host is connected to the Internet, generally through an Internet service provider (ISP), the public host expects resolved domain name to be returned from the ISP domain name server (DNS). Any other communication between the network interface and other domain name servers may not be possible.

However, if the public host is connected to the VPN, it is required to receive domain name responses from the VPN DNS since, unlike the ISP DNS, the VPN DNS stores the web site address locations of the private web sites associated with the VPN. Therefore, in order for the public host to connect to a private web site, a modification of the network parameters on the public host, to allow communication between the network interface of the public host is unattainable.

Moreover, there are instances whereby when one is connected to a virtual private network, access to public sites may be restricted. Since the public host is generally connected to the VPN via a VPN tunnel, communication between the public host and the ISP DNS does not exist. Therefore, unless the VPN DNS is capable of resolving public web site addresses, access to public web sites may not be possible when connected to a VPN.

Accordingly, there is a need for a method and apparatus for resolving a web site address when connected with a virtual private network (VPN). It is a farther object of the present invention to provide a method and apparatus that obviates or mitigates the above disadvantages.

SUMMARY OF THE INVENTION

The present invention is directed at a method and apparatus for resolving an address location for a site associated with a virtual private network and forwarding the address location to a requesting entity.

In accordance with an aspect of the present invention, there is provided:

A method for resolving a web site address when connected with a virtual private network (VPN) comprising the steps of;
  receiving a domain name request from a public host;
  resolving said domain name request at a domain name server (DNS) associated with said VPN; and
  returning an address location corresponding- to said domain name request to said public host.

In accordance with another embodiment, there is provided a method for resolving a web site address when connected with a virtual private network (VPN) comprising the steps of:
  intercepting a domain name request from a public host addressed to a pre determined domain name server (DNS);
  forwarding said domain name request to a DNS associated with said VPN;
  receiving a domain name response including an address location corresponding to said domain name request; and
  forwarding said domain name response to said public host.

In yet another embodiment, there is provided apparatus for resolving a web site address for a public host when connected with a virtual private network (VPN) comprising:
  a VPN domain name server (DNS) for resolving domain name requests; and
  a software module for forwarding a domain name request to said VPN DNS and for receiving a domain name response from said VPN DNS and for forwarding said response to said public host.

BRIEF DESCRIPTION OF THE DETAILED DRAWINGS

Figure 2:
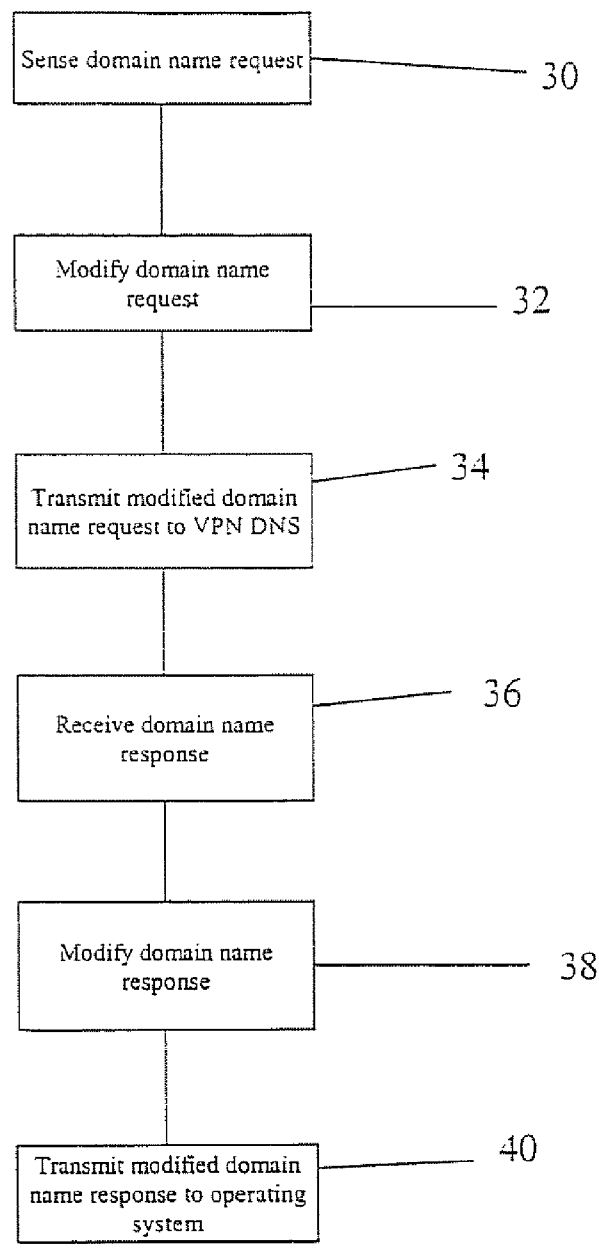

An embodiment of the present invention will be described by way of example only with reference to the accompanying drawings in which FIG. 1 is a schematic diagram of a network including a public network and a virtual private network (VPN); and FIG. 2 is a flowchart outlining a method of communicating with the network of FIG. 1.

DETAILED DESCRIPTION OF THE PREFERRED EMBODIMENT

The present invention is directed at a method and apparatus of resolving an address location for a web site when connected with a virtual private network (VPN). Once the public host is connected to, or logged on to, the VPN, a software module within the public host monitors domain name requests and routes them to a domain name server (DNS) associated with the VPN. The VPN DNS then resolves the address location request and returns the address location to the software module in the form of a domain name response. The software module then forwards the address location to the requesting public host. It will be understood that the software module is preferably a driver.

Turning to FIG. 1, a schematic diagram of a network is shown. The network 10 includes both a public network 12 and a virtual private network (VPN) 14. The public network 12 includes an Internet service provider (ISP) 16 alone with an ISP domain name server (DNS) 18. A public host 20 may be connected to the Internet 22 via the ISP 16. The public host 20 may also be connected to the VPN 14 via a VPN tunnel 22 or via the public network 12. In both cases, the public host 20 is connected to a security gateway 24 associated with the VPN 14 which requires the public host to log on to the VPN. After the log on has been verified, the public host is connected to the VPN 14. The VPN 14 includes a VPN DNS 26 as well as address locations (private hosts) 28 which are not accessible via the public network 12 (without logging in).

In public operation, in order to access the Internet, the public host accesses the Internet service provider (ISP). As will be understood by one skilled in the art, the connection between the public host and the ISP is via a dial-up connection or a direct Ethernet connection. In most cases, the public host has an agreement with the ISP to provide access to the Internet. The ISP generally includes at least one domain name server (DNS) which assists in providing web site address locations for domain name requests from the public host. In the preferred example, when the public host requests to be connected to www.certicom.com, in the preferred embodiment, the ISP DNS operates to return the actual numerical IP address for The www.certicom.com site to the public host which then establishes a connection between the public host and the requested address location.

However, if the public host requests a connection with a private web site associated with the VPN, the ISP DNS is unable to establish a connection since the address location of the private site is not stored in the ISP DNS. In order to access the private site, the public host is required to log in to the virtual private network. Unfortunately, the public host may still not be able to a establish a connection between the public host and the private site due to the fact that the parameters of the public host may not be alterable and are designated to be associated with the ISP DNS only. This is in part due to the fact that the public host may be set to only receive address locations from the ISP DNS and hence, access to private sites is not possible since they are not stored within the ISP DNS. Therefore, there is required a method and apparatus to resolve domain names within connected to the VPN.

As mentioned above, the parameters of some public hosts are not alterable, yet without the alteration, access to the virtual private network, and hence, the private sites, may not be possible. Therefore, when the public host is connected to the virtual private network, the domain name request is modified to suit the public host without requiring the parameters to be altered.

In the preferred embodiment, it will be assumed that the public host is already connected to the ISP and the ISP DNS and that the parameters of the public host are established and unalterable.

If the public host wishes to be connected to a private site located within the virtual private network, the domain name of the private network login is requested. The ISP DNS resolves the address location of the security gateway associated with the VPN and the public host is connected to a private network login site. Upon a verified login, the public host is connected to the VPN and has access to the private sites associated on the private network. In order to have the domain names of the private site resolved, the VPN DNS is provided to assist in this matter. It will be understood that the public host may still connect with various public sites by having the domain name requests resolved by the VPN DNS. This is assuming that the VPN DNS stores the address locations of the private sites associated with the VPN along with public sites. This is to made with the assumption that the VPN DNS stores all address locations (public and private). It will be understood that without a connection with the VPN DNS, the public host is unable to establish a connection with the private sites. However in order to allow the public host to connect with the private sites, the public host must be capable to receiving address locations from the VPN DNS.

Therefore, in a preferred embodiment of the present invention, after being connected to the VPN, a software module located within the public host, monitors the communications packets being transmitted and received for any domain name requests or responses. In order to notify the software module that the public host is connected to the VPN, a VPN client sends a message to the software module upon creation of the VPN tunnel alerting the software module that all future domain name requests are to be re-routed to the VPN DNS until the tunnel is closed. It will be understood that the software module is pre-stored on the public host and is part of the operating system of the public host. The software module is programmed to view all information packets, including domain name requests, which aids being processed by the public host.

Once a domain name request directed at the ISP DNS is sensed (step 30), the domain name request is then modified (step 32). Firstly, the address of the ISP DNS is replaced with the VPN DNS address and then the check sum of the domain name request is adjusted.

Although many methods to modify the check sum are available, in the preferred embodiment, the check sum modification outlined in Method For Computing the Internet Checksum, filed on even date, and assigned to the assignee of the present invention, hereby incorporated by reference, is used. For example, to modify a 16-bit checksum (HC) to a new checksum (HC'), initially, a value in the original message is modified from m to m'. The checksum HC is XORed with the 16-but hexadecimal value 0xFFFF to obtain a one's complement of HC. A difference value is the then computed from the new message m' and the old message m by standard two's complement subtraction which sets a first carry flag if the result is negative. The difference value is then decremented by one if the first carry flag is set. An intermediate checksum $HC^2$ is them computed as $HC^2$=HC+ the difference value. A second carry flag, is then set is the sum overflows 16 bits. The intermediate checksum $HC^2$ is then incremented if the second carry flag is set. The new checksum HC' is the computed by XORing HC with 0xFFFF to obtain it's one's complement. The request is then modified to replace the HC with HC'.

The modified domain name request is then transmitted to the VPN DNS (step 34) via the VPN tunnel. It will be understood that this tunnel is preferably an IPSEC tunnel. After receiving the domain name request, the VPN DNS then resolves the domain name and returns the address location to the driver in the form of a domain name response (step 36). The driver then re-modifies the check sum of the domain name response (step 38) to counter-act the original check sum modification and then transmits the modified domain name response to the public host (step 40). The original ISP DNS address is then recovered. As described above, since the public host may only accept address location responses from the ISP DNS, the modifications of the VPN DNS domain name response is required to fool the public host. The software module has to modify the address location response to show that it is being delivered by the ISP DNS and then the check sums are adjusted. After receiving the address location from the software module, the public host connects to the returned address location and operation continues until another domain name request is sensed by the driver. It will be understood that this address location may either be a part of the public network or the VPN.

It will be understood that when the VPN tunnel is closed off, the driver stops monitoring the domain name requests. All domain name requests are then sent to the ISP DNS.

In most cases, the parameters, such as address of the DNS and the servers from which to accept information, are pre-programmed into the public host and are difficult to alter.

Although the public host 20 is shown as a personal digital assistant in FIG. 1, it will be understood that the public host may also be a desktop computer or a laptop computer with data communication capabilities.

Although the invention has been described with reference to certain specific embodiments, various modifications thereof will be apparent to whose skilled in the art without departing, various modifications thereof will be apparent to those skilled in the art without departing from the spirit and scope of the invention as outlined in the claims appended hereto.

The embodiments of the invention in which an exclusive property or privilege is claimed are defined as follows:

1. A method for resolving web site addresses for a client in a public network, wherein said client is capable of connecting to a virtual private network (VPN) using said public network, and wherein parameters of said client for accepting domain name requests from a domain name server (DNS) of an internet service provider (ISP) are established and unalterable, said method comprising:
    transparently intercepting all domain name requests outbound from said client;
    examining said domain name requests to determine if a requested web site is a public site or a private site;
    if said requested web site is a public web site: routing said request directly to said DNS of said ISP; receiving an address location as a domain name response; and providing an address location to said client without altering said parameters;
    if said requested web site is a private web site: modifying said request; routing a modified request to a DNS of said VPN over a VPN tunnel; and re-modifying a response from said DNS of said VPN, said modifying and re-modifying being done to appear to said client as if said request and said response are being sent and received from said DNS of said ISP; and
    upon determining that said VPN tunnel is closed off, no longer performing said examining said domain name requests, and instead sending all domain name requests directly to said DNS of said ISP.

2. The method according to claim 1, wherein said transparently intercepting all domain name requests outbound from said client is performed by a software module within said client.

3. The method according to claim 2, wherein said software module is a driver.

4. The method according to claim 2, further comprising notifying said software module upon connecting said client to said VPN tunnel between said client and said DNS of said VPN.

5. The method according to claim 1, wherein said modifying said request comprises modifying a check sum of said outbound domain name requests and re-modifying said check sum on inbound responses from said DNS of said VPN to counter-act the original check sum modification.

6. The method according to claim 5, wherein said modification of said check sum includes computing a new check sum by XORing said check sum with a hexadecimal value to obtain a one's complement, and replacing said check sum with said new check sum.

7. The method according to claim 1, wherein said VPN tunnel is a Secure Internet Protocol (IPSec) tunnel.

8. A computer readable medium comprising computer executable instructions for resolving web site addresses for a client in a public network, wherein said client is capable of connecting to a virtual private network (VPN) using said public network, and wherein parameters of said client for accepting domain name requests from a domain name server (DNS) of an internet service provider (ISP) are established and unalterable, said computer readable medium comprising instructions executed by a processor to perform acts comprising:
    transparently intercepting all domain name requests outbound from said client;
    examining said domain name requests to determine if a requested web site is a public site or a private site;
    if said requested web site is a public web site: routing said request directly to said DNS of said ISP over a VPN tunnel; receiving an address location as a domain name response; and providing an address location to said client without altering said parameters;
    if said requested web site is a private web site: modifying said request; routing a modified request to a DNS of said VPN; and re-modifying a response from said DNS of said VPN, said modifying and re-modifying being done to appear to said client as if said request and said response are being sent and received from said DNS of said ISP; and
    upon determining that said VPN tunnel is closed off, no longer performing said examining said domain name requests and instead sending all domain name requests directly to said DNS of said ISP.

9. The computer readable medium according to claim 8, wherein said instructions for transparently intercepting all domain name requests outbound from said client is performed by a software module within said client.

10. The computer readable medium according to claim 9, wherein said software module is a driver.

11. The computer readable medium according to claim 9, further comprising instructions for: notifying said software module upon connecting said client to said VPN tunnel between said client and said DNS of said VPN.

12. The computer readable medium according to claim 8, wherein said modifying said request comprises modifying a check sum of said outbound domain name requests and re-modifying said check sum on inbound responses from said DNS of said VPN to counter-act the original check sum modification.

13. The computer readable medium according to claim 12, wherein said modification of said check sum includes computing a new check sum by XORing said check sum with a hexadecimal value to obtain a one's complement, and replacing said check sum with said new check sum.

14. The computer readable medium according to claim 8, wherein said VPN tunnel is a Secure Internet Protocol (IPSec) tunnel.

15. A client device comprising a processor and a memory, said device being configured for resolving web site addresses in a public network, wherein said client device is capable of connecting to a virtual private network (VPN) using said public network, and wherein parameters of said client device for accepting domain name requests from a domain name server (DNS) of an internet service provider (ISP) are established and unalterable, said client device being further configured for:

transparently intercepting all domain name requests outbound from said client device;

examining said domain name requests to determine if a requested web site is a public site or a private site;

if said requested web site is a public web site: routing said request directly to said DNS of said ISP; receiving an address location as a domain name response; and providing an address location to said client without altering said parameters;

if said requested web site is a private web site: modifying said request; routing a modified request to a DNS of said VPN over a VPN tunnel; and re-modifying a response from said DNS of said VPN, said modifying and re-modifying being done to appear to said client device as if said request and said response are being sent and received from said DNS of said ISP; and upon determining that said VPN tunnel is closed off, no longer performing said examining said domain name requests, and instead sending all domain name requests directly to said DNS of said ISP.

16. The client device according to claim 15 further comprising a software module, wherein said transparently intercepting all domain name requests outbound from said client device is performed by said software module.

17. The client device according to claim 16, wherein said software module is a driver.

18. The client device according to claim 17, further configured for notifying said software module upon connecting said client device to said VPN tunnel between said client device and said DNS of said VPN.

19. The client device according to claim 15, wherein said modifying said request comprises modifying a check sum of said outbound domain name requests and re-modifying said check sum on inbound responses from said DNS of said VPN to counter-act the original check sum modification.

20. The client device according to claim 19, wherein said modification of said check sum includes computing a new check sum by XORing said check sum with a hexadecimal value to obtain a one's complement, and replacing said check sum with said new check sum.

21. The client device according to claim 15, wherein said VPN tunnel is a Secure Internet Protocol (IPSec) tunnel.

\* \* \* \* \*